US012224495B2

(12) United States Patent
Thornton et al.

(10) Patent No.: US 12,224,495 B2
(45) Date of Patent: Feb. 11, 2025

(54) MULTI-FUNCTION SCALABLE ANTENNA ARRAY

(71) Applicant: Battelle Memorial Institute, Columbus, OH (US)

(72) Inventors: Douglas A. Thornton, Upper Arlington, OH (US); Kevin P. Crawford, Dublin, OH (US); Daniel A. Perkins, Lewis Center, OH (US); Raphael J. Welsh, Powell, OH (US); Curtis A. Cutright, Albany, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 0 days.

(21) Appl. No.: 18/740,800

(22) Filed: Jun. 12, 2024

(65) Prior Publication Data

US 2024/0332816 A1 Oct. 3, 2024

Related U.S. Application Data

(63) Continuation of application No. 18/390,249, filed on Dec. 20, 2023, now Pat. No. 12,040,545, which is a (Continued)

(51) Int. Cl.

*H01Q 17/00* (2006.01)
*H01Q 21/00* (2006.01)

(Continued)

(52) U.S. Cl.

CPC ......... *H01Q 21/0025* (2013.01); *H01Q 21/22* (2013.01)

(58) Field of Classification Search

CPC .... H01Q 21/00; H01Q 21/0025; H01Q 21/22; H01Q 17/00; H01Q 1/24; H01Q 3/34;

(Continued)

(56) References Cited

U.S. PATENT DOCUMENTS

| | | | | |
|---|---|---|---|---|
| 9,391,375 | B1 | 7/2016 | Bales et al. | |
| 11,362,432 | B2 * | 6/2022 | Perkins | H01P 5/10 |

(Continued)

OTHER PUBLICATIONS

Zarb-Adami, K., et al. "Beaforming Techniques for Large-N Aperture Arrays" downloaded from the internet https://www.researchgate.net/publication/45936385 Aug. 24, 2010 entire document.

(Continued)

*Primary Examiner* — Tho G Phan

(74) *Attorney, Agent, or Firm* — Lippes Mathias LLP

(57) ABSTRACT

A modular radio frequency (RF) device includes N base units, each including a differential segmented array (DSA) tile with a support board and a two-dimensional (2D) array of electrically conductive tapered projections disposed on the support board. Neighboring pairs of the electrically conductive tapered projections form RF pixels. The N DSA tiles are arranged to form an RF aperture. The N base units are programmed to switch the RF aperture between a first operating mode and a second operating mode. In the first operating mode, the N base units are operated as at least two independent subsets with each subset operating as an RF transmitter or receiver independently of the other subsets. In the second operating mode all N base units coherently combine as a single phased array RF transmitter or receiver.

19 Claims, 2 Drawing Sheets

Related U.S. Application Data continuation of application No. 18/226,844, filed on Jul. 27, 2023, now Pat. No. 11,909,117.

(60) Provisional application No. 63/394,462, filed on Aug. 2, 2022.

(51) Int. Cl.
*H01Q 21/22* (2006.01)
*H04B 1/40* (2015.01)

(58) Field of Classification Search
CPC .......... H01Q 5/31; H01Q 5/314; H01Q 21/06; H01Q 21/061; H01Q 23/00; H01P 1/18; H04B 1/40; H04B 1/42
See application file for complete search history.

(56) References Cited

U.S. PATENT DOCUMENTS

| | | | | |
|---|---|---|---|---|
| 11,605,899 | B2 * | 3/2023 | Welsh | H01Q 21/205 |
| 12,040,545 | B2 * | 7/2024 | Thornton | H01Q 21/0025 |
| 2010/0136927 | A1 | 6/2010 | Rofougaran | |
| 2020/0343645 | A1 | 10/2020 | Perkins et al. | |
| 2020/0344392 | A1 | 10/2020 | Huang et al. | |

OTHER PUBLICATIONS

International Search Report of Application No. PCT/US2023/28766 Dated Oct. 19, 2023.

* cited by examiner

MULTI-FUNCTION SCALABLE ANTENNA ARRAY

This application is a continuation of U.S. application Ser. No. 18/390,249 filed Dec. 20, 2023, now issued as U.S. Pat. No. 12,040,545, which is a continuation of U.S. application Ser. No. 18/226,844 filed Jul. 27, 2023, now issued as U.S. Pat. No. 11,909,117, which claims the benefit of provisional application No. 63/394,462 filed Aug. 2, 2022. Provisional application No. 63/394,462 filed Aug. 2, 2022 is incorporated herein by reference in its entirety.

BACKGROUND

The following relates to the radio frequency (RF) aperture arts, gigahertz (GHz) RF arts, broadband RF arts, broadband GHz RF arts, and to the like.

BRIEF SUMMARY

In accordance with some nonlimiting illustrative embodiments disclosed herein, a base unit comprises: a differential segmented aperture (DSA) tile including a support board and a two-dimensional (2D) array of electrically conductive tapered projections disposed on the support board with the electrically conductive tapered projections tapering in a direction extending away from the support board, wherein neighboring pairs of the electrically conductive tapered projections form RF pixels; and at least one RF unit (RFU) having RF connections with the DSA tile to transmit and/or receive RF signals via the RF pixels of the DSA tile. The at least one RFU of the base unit is programmed to operate the base unit in a plurality of different RF transmit and/or receive modes including at least one independent mode in which the base unit operates as an RF transmitter or receiver independently of any other base unit and at least one cooperative mode in which the base unit coherently combine with at least one other base unit as a single phased array RF transmitter or receiver.

In accordance with some nonlimiting illustrative embodiments disclosed herein, a modular RF device includes N base units as set forth in the immediately preceding paragraph, where N is an integer greater than or equal to two. The N DSA tiles of the N base units are arranged to form an RF aperture.

In accordance with some nonlimiting illustrative embodiments disclosed herein, a modular RF transmit and/or receive method is disclosed. N base units are provided, where N is an integer greater than or equal to two. Each base unit includes a DSA tile including a support board and a 2D array of electrically conductive tapered projections disposed on the support board with the electrically conductive tapered projections tapering in a direction extending away from the support board. Neighboring pairs of the electrically conductive tapered projections form RF pixels. The N DSA tiles of the N base units are arranged to form an RF aperture. The RF aperture is switched between a first operating mode and a second operating mode. In the first operating mode, the N base units are operated as at least two independent subsets with each subset operating as an RF transmitter or receiver independently of the other subsets. In the second operating mode all N base units coherently combine as a single phased array RF transmitter or receiver.

In some embodiments of the method of the immediately preceding paragraph, each base unit of the N base units further includes at least one RFU having RF connections with the DSA tile of the base unit, and the RFU's of the base units are programmed to switch the RF aperture between the first operating mode and the second operating mode. In some embodiments of the method of the immediately preceding paragraph, the N DSA tiles of the N base units are rearranged to change a shape of the RF aperture.

In accordance with some nonlimiting illustrative embodiments disclosed herein, a modular RF device includes N base units where N is an integer greater than or equal to two. Each base unit includes a DSA tile including a support board and a 2D array of electrically conductive tapered projections disposed on the support board with the electrically conductive tapered projections tapering in a direction extending away from the support board. Neighboring pairs of the electrically conductive tapered projections form RF pixels. The N DSA tiles of the N base units are arranged to form an RF aperture. The N base units are programmed to switch the RF aperture between a first operating mode and a second operating mode. In the first operating mode, the N base units are operated as at least two independent subsets with each subset operating as an RF transmitter or receiver independently of the other subsets. In the second operating mode all N base units coherently combine as a single phased array RF transmitter or receiver.

BRIEF DESCRIPTION OF THE DRAWINGS

Any quantitative dimensions shown in the drawing are to be understood as non-limiting illustrative examples. Unless otherwise indicated, the drawings are not to scale; if any aspect of the drawings is indicated as being to scale, the illustrated scale is to be understood as non-limiting illustrative example.

DETAILED DESCRIPTION

Figure 1:
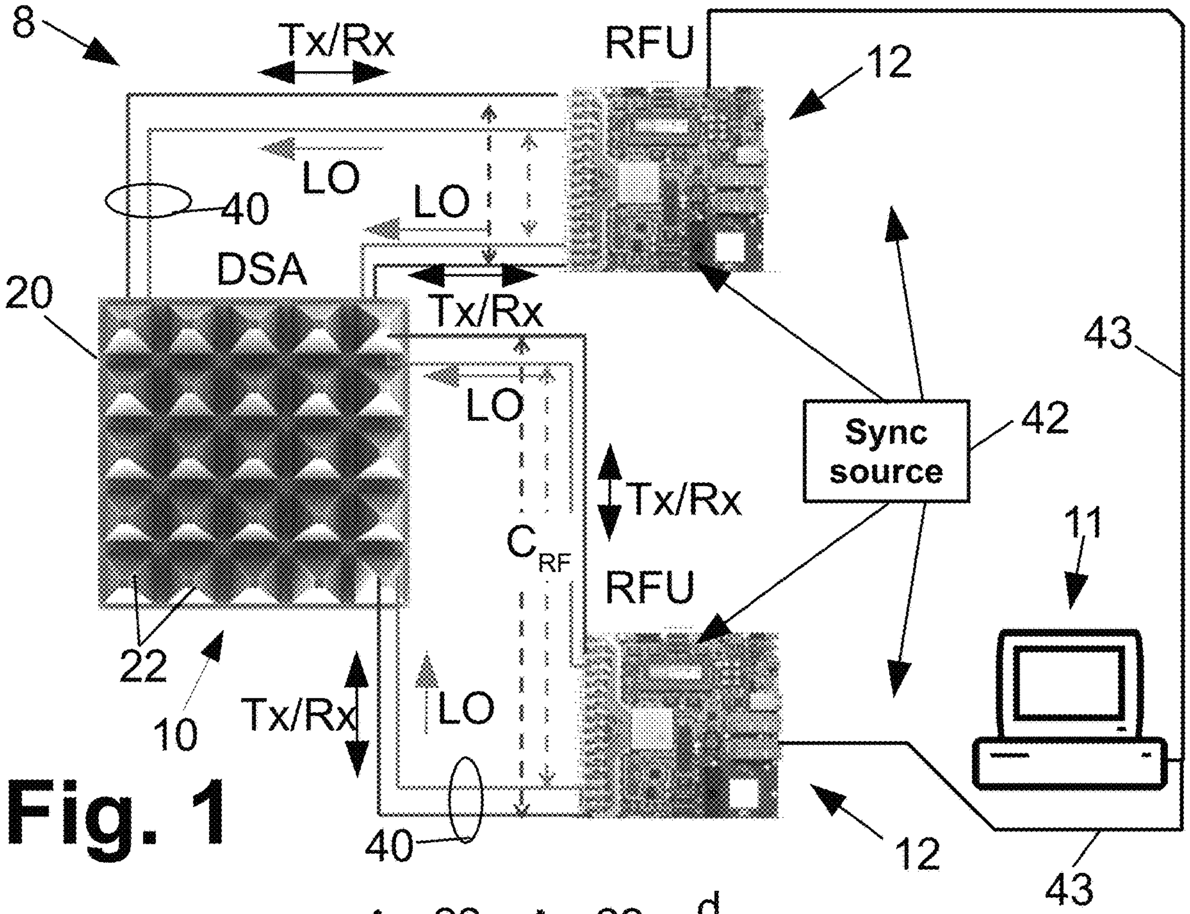
FIG. 1 diagrammatically illustrates a base unit including a differential segmented aperture (DSA) tile and at least one RF unit (RFU; illustrative two RFU's) having RF connections with the DSA tile to transmit and/or receive RF signals via the RF pixels of the DSA tile.

To move RF communications systems for military and telecommunication and other applications to higher throughput and greater ranges, the systems need to transfer more power. Throughput is a function of signal to noise ratio (SNR) and instantaneous bandwidth. As bandwidth increases, so does noise. A way to increase signal over this noise is power. Range is directly proportional to the square of power. There are two ways of increasing the radiated power: the first is creating larger electric fields through higher amplification, at the cost of increased electrical power; while the second is increasing the gain of the antenna to focus the electric field more narrowly. Embodiments disclosed herein provide solutions that use base units with tile-able aperture arrays to create a scalable solution to the challenges of dynamically changing environments where, as a nonlimiting illustrative example, the number of frequencies and signals, range and throughput needs interact to cause a need at one moment for many signals at different bands to be interacted with, and at other moments a single signal in one band, at long range to be interacted with.

Embodiments disclosed herein improve upon existing designs that entail optimization for either case, many signals and many frequencies, or greater range/throughput, to a lesser number of signals and frequencies. Each tile is a differential segmented array (DSA) tile which is a standalone digital to air interface (DAI) that may optionally have built in filtering, amplification, and digitization. These DSA tiles can be used independently, or cooperatively through synchronizing the phase of the DSA tiles to create a much larger array. Such modularity gives the user the ability to assign their RF assets based upon need, and to dynamically switch between operating on multiple bands with multiple signals at a lower power and low directivity, and then rapidly switching to a high-power, high directivity operation as desired. Each DSA tile is capable of operating over wide bandwidth, providing bandwidth at GHz or tens of GHz. By operating the DSA tiles independently, large swaths of spectrum can be accessed. By operating the DSA tiles cooperatively, large, focused power can be delivered. As a small array or sub-arrays. If the RFU has four channels, it is feasible for the DSA tile to operate at four frequency bands at the same time. If the RFU has 8 channels, then 8 bands are potentially accessible. In an example with 4 base units, with a single RFU each with four channels, operation can be conducted over 16 bands at the same time, and then go to 8, or 4, or 2, or 1 bands, each time increasing power and decreasing beam width. These are merely nonlimiting illustrative operational examples. A channel includes a complete RF signal chain. The at least one RFU should support at least 2 RF channels to enable coherent combination of DSA tiles. Each RF channel hooks up to one or more RF pixels. A minimum system would have four pixels hooked up to two channels. As a nonlimiting illustrative example, each DSA tile could have 32 pixels, 16 channels, 1 RFU; or some other similar cascade.

In one nonlimiting illustrative embodiment, each DSA tile is 10-inch by 10-inch in area with a thickness of around 4-6 inches, and can be manufactured at low cost. This approach enables users to keep few part numbers in inventory (e.g., the interchangeable DSA tiles), and construct a modular RF device of a desired size and geometry by combining a chosen number of DSA tiles.

The disclosed approach employing configurable and tileable DSA tiles has numerous advantages over existing approach such as omni-directional antennas, pointed passive antennas, or single function phased arrays. Omni-directional antennas provide nearly complete hemispherical coverage but require extreme amounts of power to increase throughput or range, in some use cases on the order of 1 kW of RF power to serve a communications system, which would draw approximately 10 KW of electrical power to generate. Pointed passive antennas improve antenna gain and can reduce that electrical power significantly, but involve physical pointing through either moving the platform (e.g., truck, airplane, boat, unmanned aerial vehicle, or the like) to which the antenna is attached, or gimballing the antenna. Moving the platform creates challenging operation, particularly as the gain becomes higher and thus the antenna more directive (narrower field of view). Gimballing the antenna is feasible, but occupies a large footprint and increased signature, while limiting platform dynamics. Phased array solutions are undesirably platform and function specific, increasing total costs and decreasing functional flexibility.

Modular RF devices disclosed herein which are constructed using DSA tiles enable an RF system that can transform its mode of operation to provide high power (>70 dBm) and narrow beam widths (10°×10° scan volumes above 2.4 GHZ) when tiled to large sizes as needed, and provide multiple signals of interest in broad bandwidths (for example starting at 40 MHz in some nonlimiting illustrative embodiments), from a flat panel array. Technical challenges such as signal loss, weight, size and protrusions from exterior to interior are resolved by the disclosed modular approach. Heat is generated externally to the platform eliminating the need to move the heat from internal to external. The disclosed modular RF devices provide a general purpose steerable array that is made up of DSA tiles. These DSA tiles can be used independently, or in conjunction with each other. A small number of tiles can be purchased and used initially, and then the modular RF device can be scaled up in size and power by adding more DSA tiles. To interoperate with existing systems, the RF data to and from the DSA tiles are in some embodiments streamed in a digital I/Q format, eliminating cable loss and reducing protrusion size and weight. In some embodiments, each DSA tile uses an efficient small power amplifier, which is expected to achieve a factor-of-ten reduction in electrical power requirements.

In the following, some illustrative embodiments of suitable base units and modular RF devices constructed therefrom are described.

With reference to FIG. 1, a base unit 8 includes a differential segmented array (DSA) tile 10, and at least one RF unit (RFU) 12 having RF connections with the DSA tile 10. The RFU 12 may be an RF integrated circuit (RFIC) or an RF system-on-module (RFSOM), that is, a board-level RF circuit that integrates RF system functionality in a single board or module. The illustrative example includes two RFU's 12. The RFU(s) 12 may, by way of nonlimiting illustrative example, comprise field-programmable gate array (FPGA) devices such as Xilinx FPGAs available from Xilinx, Inc. (a subsidiary of Advanced Micro Devices (AMD), Santa Clara, CA, USA), other types of FPGAs operative at RF frequencies, RF application-specific integrated circuit (ASIC) devices, three-dimensional (3D) RFICs (for example constructed of two or more stacked RFICs), or an RFSOM comprising suitable integrated circuit (IC) components such as at least one RF digital signal processing (DSP) IC, at least one random access memory (RAM) IC, and/or so forth mounted on a single printed circuit board (PCB). These are merely nonlimiting illustrative examples.

Figure 2:
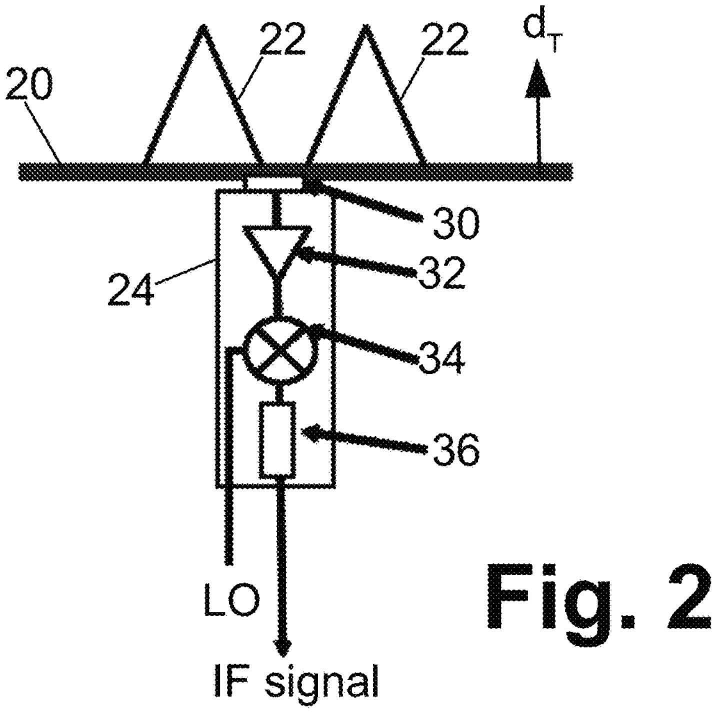
FIG. 2 diagrammatically illustrates one RF pixel of the DSA tile of the base unit of FIG. 1 by way of diagrammatic side-sectional view.

With continuing reference to FIG. 1 and with further reference to FIG. 2, the DSA tile 10 includes a support board 20 and a two-dimensional (2D) array of electrically conductive tapered projections 22 disposed on the support board, as seen in the front view of the DSA tile 10 shown in FIG. 1. As seen in FIG. 2, the electrically conductive tapered projections 22 taper in a direction dr extending away from the support board 20, and neighboring pairs of the electrically conductive tapered projections 22 form RF pixels (where FIG. 2 diagrammatically illustrates one RF pixel by way of diagrammatic side-sectional view). Some DSA designs that can be suitably used for the board 20 and electrically conductive projections 22 of the DSA tile 10 are described, by way of nonlimiting illustrative example, in Welsh et al., U.S. Pub. No. 2020/0343929 A1 published Oct. 29, 2020 which is incorporated herein by reference in its entirety. The DSA tile 10 advantageously has a broad bandwidth, e.g. at least 2 GHz bandwidth in some embodiments or even larger, e.g. 10's of GHz.

FIG. 2 further diagrammatically shows a nonlimiting illustrative example of suitable on-board electronics 24 of the DSA tile 10 (or more specifically, shows a portion of the on-board electronics 24 for the single RF pixel shown in FIG. 2). In RF receive mode, the on-board electronics 24 are configured to heterodyne RF signals received by the RF pixel to an intermediate frequency (IF). More generally, the heterodyne function can be executed before digitization in the analog domain, or after digitization with a direct sampling receiver in the digital domain. The illustrative on-board electronics 24 include a balun 30 providing a single-ended output in response to the differential RF signal input from the two projections 22 of the pair; an optional low noise amplifier (LNA) 32 to boost the RF signal; an RF mixer 34 for heterodyning the received RF signal to the IF frequency, and an optional anti-aliasing filter 36. In RF transmit mode, the on-board electronics 24 operate in the reverse—that is, the RF mixer 34 is connected to operate in a receive mode to heterodyne an RF signal received by a corresponding RF pixel with the LO/Sync signal to generate a received intermediate frequency (IF) signal, and in a transmit mode to heterodyne a received IF signal to generate an RF transmit signal that is coupled to the corresponding RF pixel. Conversely, the LO/Sync signal could be used to synchronize the data converters (analog to digital, digital to analog) on a direct sampling or zero-IF architecture to ensure phase synchronization across all channels. It is to be appreciated that this is merely an illustrative example, and that other configurations of the on-board electronics 24 are alternatively contemplated. In some embodiments, the baluns 30 are chip baluns suitably mounted on a backside of a board 38 on which the 2D array of electrically conductive tapered projections 22 are mounted. Other design aspects described in Welsh et al., U.S. Pub. No. 2020/0343929 A1 may be suitably incorporated into the DSA 10.

As further diagrammatically shown in FIG. 1, the RFU's 12 have RF connections 40 with the DSA tile 10. The RF connections 40 can be coaxial RF cables, triaxial RF cables, or the like. In a variant embodiment, direct card-to-card connectors can be used, that go from circuit card to circuit card without cables in between, thereby reducing signal transit distance. The illustrative RF connections 40 include an LO connection delivering the LO/Sync signal from the RFU 12 to the DSA 10, and a Tx/Rx line that, in receive mode, delivers the RF signal received by the DSA 10 (after processing by the on-board electronics 24) to the RFU's 12; and in transmit mode delivers the an RF IF signal to be transmitted from the RFU's 12 to the DSA 10 (where it is heterodyned to the desired transmit RF frequency by the mixer 34 prior to transmission via the RF pixel comprising the neighboring tapered projections 22). The RF connections 40 have a length (denoted CRF in FIG. 2) of length 10 meters or less in some embodiments to limit propagation delay, although longer RF connections are contemplated if the resulting propagation delay is acceptable for a given application. Conversely, the mixer 34 could be located on the same circuit card, or even within the RFU 12 itself. In this case the LO/Sync signal does not transfer into the DSA tile 10 itself. In another variant, a direct sampling or zero-IF embodiment has no external mixer and the LO/Sync is brought directly into the RFU 12.

Operation of the base unit 8 of FIGS. 1 and 2 includes the following. RF signals collected by the RF pixels of the DSA tile 10 (and optionally frequency-shifted to the IF frequency and optionally otherwise analog-processed, e.g. including amplification by LNA 32 and filtering by anti-aliasing filter 36) are transmitted via the RF connections 40 to the RFU's 12, which are programmed or otherwise configured (e.g. by suitable design of an application-specific integrated circuit, or ASIC, or a suitably programmed field-programmable gate array, or FPGA, various combinations thereof, or so forth) to receive the RF signal data from the DSA tile 10, and to digitize the RF signal data to generate digitized RF signal data, and to transmit the digitized RF signal data via a wired and/or wireless Ethernet, WiFi, or other digital data link to a computer or other RF data-consuming device 11. Additionally or alternatively, the digitized RF signal data may be stored locally at the RFU 12. In this case, a trigger can communicate when to stream the stored data to the DSA tile 10 or to the downstream computer 11. By way of nonlimiting illustrative example, the RFU's 12 may, for example, be HTG-ZRF-16 RFU platforms (available from HiTech Global, LLC, San Jose, CA, USA) whose RF input pins are connected to designated RF pixels of the DSA 10 by the RF connections 40. Using custom-built RFU's is also contemplated.

The illustrative base unit 8 of FIG. 1 includes two RFU's 12. However, more generally the number of RFU's of the base unit 8 can be as few as one, or two (as shown), or three, or as many as needed to receive, digitize, stream, and/or locally store the received RF signal data for the processed number of channels. If multiple RFU's 12 are employed, then each RFU 12 in general receives, digitizes, streams, and/or stores RF signal data from some assigned subset of the RF pixels of the DSA 10. If multiple RFU's 12 are employed in the base unit 8, then they may be beneficially synchronized in time and/or across multiple transmit and/or receive channels. To this end, as shown in FIG. 1, a synchronization signal source 42 is configured to output a local oscillator (LO) synchronization signal (or, in some other embodiments, a system reference clock serving as the synchronization signal) configured to be received by the RFU's of the N base units. In the illustrative example, the RFU's 12 of the base unit 8 have local oscillators generating the LO/Sync signals that are synchronized to the LO synchronization signal. In the case of a modular RF device constructed from multiple base units 8 (see FIG. 3 and related discussion), the synchronization source 42 suitably provides the synchronization signal to synchronize the RFU's of the multiple base units 8 of the modular RF device, at least when the base units 8 are operating in a cooperative mode in which two or more base units 8 cooperatively operate to provide a combined phased array RF transmitter or receiver. The synchronization signal source 42 can be variously embodied, for example as an RF antenna outputting the LO synchronization signal, or as one or more of the base units making up a modular RF device. In this latter case, for example, one of the base units 8 may serve as the synchronization source 42 by having an RFU 12 that is programmed to generate the synchronization signal which can then be distributed to the other RFU's 12 of the base units 8 making up the modular RF device either by using its connected DSA tile 10 to emit the LO synchronization via the air or by way of wire RF connections (e.g. coaxial cables connecting between the RFU's of the modular RF device).

In some embodiments, there are two synchronization signals. The first synchronization signal is a LO/Sync signal which synchronizes the analog-to-digital and/or digital-to-analog data converters and optionally the mixer 34, to keep phase alignment. The second synchronization signal is a pulses-per-second (PPS) signal. The PPS signal is operative at the other side of the interface, for synchronizing the digital data to/from the computer 11 to ensure sample alignment as the data travels out of the base units 8. The PPS signal source may be implemented, for example, as a digital clock. The PPS signal provides synchronization for the digital data transfer from the RFU(s) to a downstream digitized RF data consumer such as the illustrative computer 11. The disclosed dual synchronization using the LO/Sync and PPS facilitates cooperation amongst the DSA tiles 10. The PPS signal may be implemented in other ways. For example, an illustrative physical Ethernet or other wired data network 43 may be employed to communicate digital data between the RFU's 12 and the computer or other RF data-consuming device 11, and the shared Ethernet 43 may incorporate a PPS signal alongside the other information traversing Ethernet 43. The PPS signal in such an embodiment may be implemented according to a precision time protocol (PTP) standard, for example utilizing IEEE 1588 Precision Time Protocol, Internet Engineering Task Force (IETF) Network Time Protocol, Synchronous Ethernet (SyncE) protocol, or so forth.

FIG. 2 diagrammatically illustrates a case in which heterodyning is used, and the mixers 34 are located with the on-board electronics 24 of the DSA tile 10 to provide heterodyning of the RF signal received or transmitted via each RF pixel. A disadvantage of this approach is that there is an instance of the mixer 34 for each RF pixel, thus entailing substantial duplication of the mixer electronics.

In one variant embodiment, the mixer 34 may be disposed at (i.e. implemented by) the RFU(s) 12, rather than being implemented in the on-board electronics 24 as shown in FIG. 2. In this variant, the synchronization signal is shared amongst the RFUs 12 to serve as the LO input to the on-RFU mixer, but the RFU 12 then distributes the mixer to each channel. Since the mixing is done at the RFU 12 in this variant embodiment, there is advantageously no need to transmit the LO synchronization signals to the DSA tile 10 as shown in FIG. 1, or amongst the pixels of that DSA tile 10. Put another way, in this variant embodiment the LO/Sync signal inputs shown in FIG. 1 running from the RFUs 12 to the DSA tile 10 can be omitted, along with omission of the on-tile LO distribution wiring.

In another variant embodiment, the mixers 34 are omitted entirely, and instead direct sampling is employed (without heterodyning). This approach is feasible if the bandwidth of the analog-to-digital converters (ADCs, for receive mode) and/or digital-to analog-converters (DACs, for transmit mode) of the RFU 12 is high enough to collect the whole RF signal across the entire design-basis bandwidth at the same time. In this case the synchronization source 42 is suitably a system reference clock that is used to synchronize the sampling of the ADCs and/or DACs so that they are all phase-aligned. In this variant embodiment, the system reference clock replaces the LO synchronization signal, and the system reference clock is routed to each RFU 12 (but is not routed to the DSA tile 10 or distributed amongst its RF pixels).

The RFU's 12 are programmed or otherwise configured to provide flexible operation of the DSA tile 10. The RFU's 12 of the base unit 8 are programmed to operate the base unit 8 in a plurality of different RF transmit and/or receive modes, including at least one independent mode in which the base unit 8 operates as an RF transmitter or receiver independently of any other base unit of a modular RF device, and at least one cooperative mode in which the base unit 8 coherently combine with at least one other base unit of a modular RF device as a single phased array RF transmitter or receiver.

Figure 3:
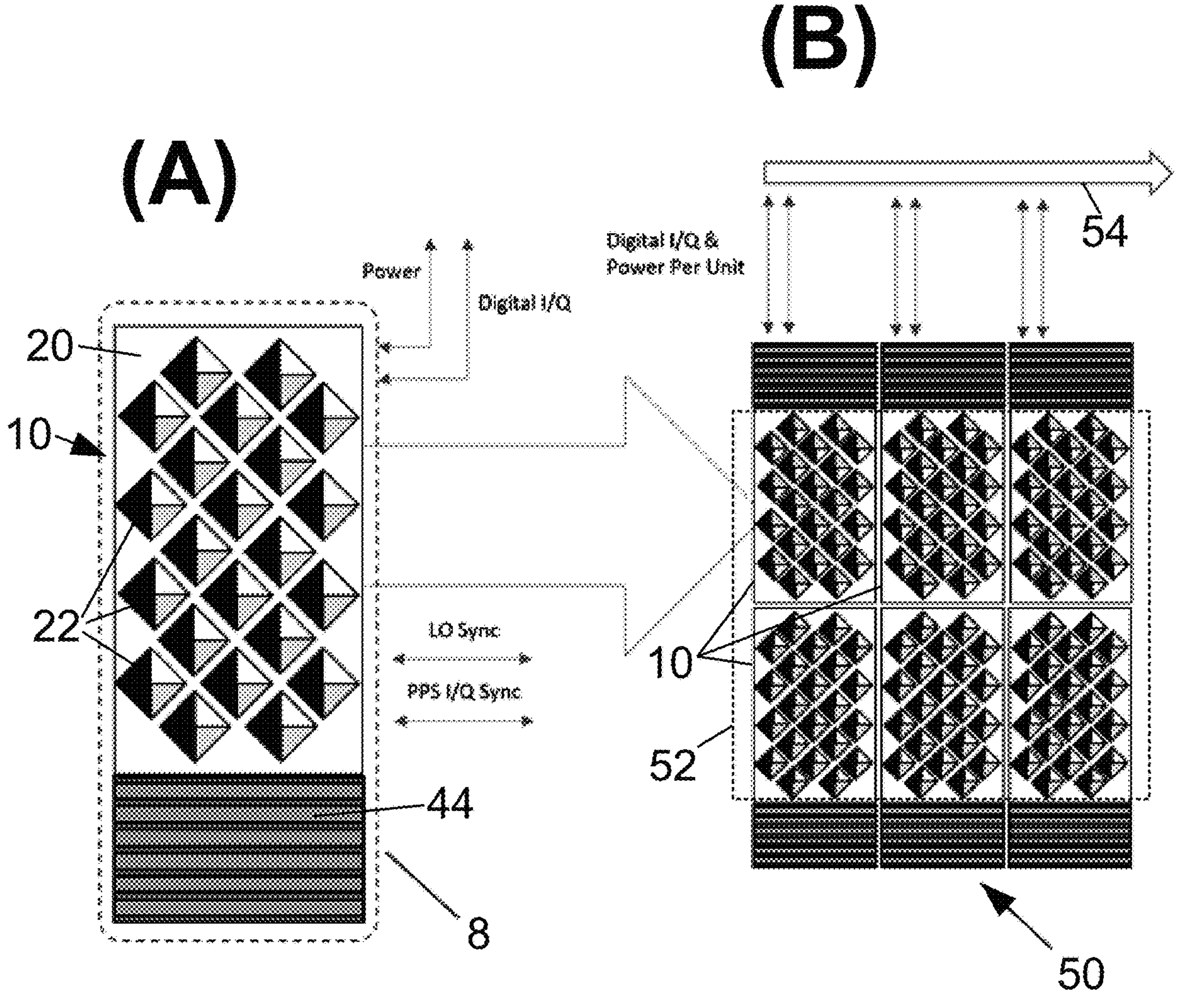
FIG. 3 diagrammatically illustrates (A) a base unit, and (B) a modular RF device comprising N base units (illustrative six base units) arranged to form an RF aperture (illustrative 2×3 tile aperture).

With reference to FIG. 3, use of multiple base units to form a modular RF device is illustrated. FIG. 3, part (A) depicts another embodiment of a single base unit 8 which is similar to that shown in FIGS. 1 and 2, and again includes the 2D array of electrically conductive tapered projections 22 disposed on the support board 20, with the electrically conductive tapered projections 22 tapering in a direction extending away from the support board 20 (as shown in FIG. 2), and wherein neighboring pairs of the electrically conductive tapered projections form RF pixels (as again shown in FIG. 2). FIG. 3 part (A) shows only the DSA tile 10 of the base unit 8, but it is to be understood that the base unit 8 of FIG. 3 may include at least one RFU 12 and associated RF connections 40 as shown in FIG. 1, and that the back side of the DSA 10 may include the on-board electronics 24 as shown in FIG. 2. It should also be noted that it is contemplated to mount the at least one RFU 12 on the backside of the DSA tile 10 as well, to provide a compact base unit 8. The base unit 8 of FIG. 3 part (A) further includes a heat sink 44 not included in FIG. 1. The optional heat sink 44 facilitates higher-power operation. In this case, the support board 20 may include a ground plate to provide thermal conductivity from the tapered projections 22 to the heat sink 44. In this case, the on-board electronics 24 (and the at least one RFU 12, if backside mounted) may optionally be disposed on separate perpendicular circuit boards that are oriented perpendicularly to the support board 20 that supports the tapered projections 22, as described in Welsh et al., U.S. Pub. No. 2020/0343929 A1 published Oct. 29, 2020 which is incorporated herein by reference in its entirety.

Another feature of the DSA tile 10 of the base unit 8 shown in FIG. 3 part (A) relates to the orientation of the tapered projections 22. As seen in the embodiment of FIG. 3 part (A), the support board 20 is rectangular and the electrically conductive tapered projections 22 in this embodiment have square bases oriented at 45° respective to the rectangular support board 20. This arrangement has certain benefits if the DSA 10 is positioned with one edge parallel to the ground (which is a common orientation), in which case the tapered projections 22 have their square bases oriented at 45° respective to the ground. This facilitates use of the base unit 8 of FIG. 3 part (A) in multiple-input and multiple-output (MIMO) radios, which are commonly used in terrestrial communications for communication protocols such as IEEE 802.11, HPSA+, WiMAX, 3GPP, ATSC, and the like and which often employ polarizations oriented at +45° and −45° to the ground.

FIG. 3 part (A) also diagrammatically shows the LO synchronization signal received from LO synchronization source 42 (see FIG. 1), electric power input, the digital RF signal data output via the line labeled "digital I/Q" (which assumes two polarizations are acquired, e.g. +45° polarization and −45° polarization for the tapered projections 22 whose square bases are oriented at 45° as shown in part (A)), and a PPS I/Q sync signal line. As previously noted, in some embodiments the PPS I/Q sync signal line could be implemented via the illustrative physical Ethernet 43 using a precision time protocol (PTP) standard. In addition to frequency flexibility, polarization flexibility is provided by the disclosed embodiments. The DSA tile 10 provides orthogonal polarizations, e.g., (0°,90°), (−45°, +45°), When those orthogonal polarizations are handled by at least two separate channels, the DSA tiles 10 can operate on isolated polarizations native to the DSA tile orientation, or cooperate through phase shifting to create any polarization. For example, when two orthogonal polarizations are shifted in phase by 90° and combined in the digital domain, a circular polarization is obtained. By weighting the combination, diagonal polarizations can be obtained. In one operational mode, each base unit can operate on an individual polarization, with other base units operating on a different polarization. They could then switch to cooperate on a single polarization. Such an approach may be useful in searching for signals of an unknown polarization with individual base units, and when found, focusing all base units on the detected polarization.

FIG. 3 part (B) illustrates multiple base units 8 of the embodiment shown in FIG. 3 to form a modular RF device 50. FIG. 3 part (B) shows an example in which six base units 8 are combined in a 3×2 grid to form a flat planar RF aperture 52. More generally, N base units 8 can be arranged to form the RF aperture 52, where N is an integer greater than or equal to two, wherein the N DSA tiles of the N base units are arranged to form an RF aperture. In the example of FIG. 3 part (B), N=6. Advantageously, the N DSA tiles 10 of the N base units 8 can be rearranged as desired to change a shape of the RF aperture of the modular RF device 50. For example, the N=6 base units shown in FIG. 3 part (B) arranged in a 3×2 grid could be rearranged as a 2×3 grid, or as a 1×6 grid, or as a 6×1 grid. Furthermore, base units can be removed or added, as well as rearranged, to design a desired size and shape for the tiled RF aperture 52. Also shown in FIG. 3 part (B) is a power and digital data transfer bus 54 which connects to each of the N base units 8 to enable signals for RF transmission to be sent to the RF device 50 and to enable received RF signal data to be moved off of or onto the RF device 50. The bus 54 can in general be a wired bus, a wireless bus, or a combination thereof.

The at least one RFU 12 of each base unit 8 of the modular RF device 50 is programmed to operate the base unit 8 in a plurality of different RF transmit and/or receive modes, including at least one independent mode in which the base unit 8 operates as an RF transmitter or receiver independently of any other base unit of the modular RF device 50, and at least one cooperative mode in which the base unit 8 coherently combine with at least one other base unit of the modular RF device 50 as a single phased array RF transmitter or receiver. As an example of a cooperative mode, all six base units 8 of the modular RF device 50 of FIG. 3 part (B) can coherently combine to provide a maximum RF aperture size (e.g., the six base units 8 coherently combine to create constructive or destructive interference patterns to yield more power, or greater sensitivity in a desired direction or directions), or some subset of the N base units can be coherently combined to provide an operational RF aperture for RF transmit and/or RF receive that is in between the size of a single DSA tile and the size of the combined physical RF aperture 52. In another example, the RFU's 12 are programmed to operate the N base units 8 as at least two independent subsets with each subset operating as an RF transmitter or receiver independently of the other subsets. When two or more base units 8 are operating cooperatively as a single phased array RF transmitter or receiver, the LO synchronization signal output by the LO synchronization source 42 advantageously provides synchronization of the LO oscillators of all the RFU's of the cooperating base units.

The illustrative modular RF device 50 of FIG. 3 part (B) has the N=6 DSA tiles arranged as a flat planar RF aperture. However, it is also contemplated to arrange the tiles to provide a curved RF aperture (albeit with the curvature being a faceted curvature due to its construction using flat DSA tiles).

The modular RF device 50 provides an RF aperture that is tightly coupled to supporting electronics that enable the import and export of RF data in digital format creating a digital air interface (DAI), where the system can be synchronized in the delivery of its digital data and the phase of its internal signals to operate in conjunction with other DAI. Each base unit 8 can operate alone, providing phased array capabilities over a wide range of bandwidth. Multiple base units 8 can be co-located to create larger aperture area as shown in FIG. 3 part (B) to increase array gain and transmit power. When operating coherently combined the local oscillators are synchronized between the base units 8 using the LO synchronization signal to create phased array capabilities. Multiple co-located base units 8 can operate independently or in small groups to increase the number of simultaneous signals operated on. Modes of operation can be changed dynamically via a data interface requiring no physical change to the base units 8 or to the arrangement of their DSA tiles 10. Mode change can thus occur in 20 milliseconds or less, and in some embodiments in 10 milliseconds or less, dependent on factors such as the speed of the RFU's 12 and propagation delays in the RF connections 40 (the latter can be reduced by keeping those RF connections short, e.g. 10 meters or less in some embodiments). Each base unit 8 can operate in one or more slices of instantaneous bandwidth (e.g., 100 MHz). If more than one base unit 8 is available, one slice could be coordinated with other base units 8 while the other is not.

The modular RF device 50 thus provides a base unit 8 with an ultra-wideband aperture array, supporting analog electronics 24 for amplification, filtering, and channel routing, and digital radio electronics implemented in the illustrative embodiments by the RFU's 12. The base unit 8 is self-contained with a power and I/Q input/output and thermal management (e.g., via heat sink 44 shown in FIG. 3 part (A)). The DSA tile 10 of the base unit 8 could be square or rectangular (as shown) depending upon the engineering trades for the specific product variant, or could have another geometry such as a hexagonal shape.

To allow multiple base units 8 to coherently combine, the LO synchronization signal is generated by the LO synchronization source 42, which may be a separate LO synchronization signal generator or may be generated internally by one of the RFU's and distributed to the other RFU's. The LO synchronization signal enables the phase of signals to be synchronized across multiple base units 8 to enable operation as a phased array RF transmitter for tasks such as beam steering and direction finding applications. For example, the modular RF device 50 of FIG. 3 part (B) is expected to be capable of providing a beam width of 10°×10° or less at a frequency of 2.4 GHz or higher.

As previously discussed, the at least one RFU 12 of each base unit 8 of the modular RF device 50 is programmed to operate the base unit 8 in a plurality of different RF transmit and/or receive modes, including at least one independent mode in which the base unit 8 operates as an RF transmitter or receiver independently of any other base unit of the modular RF device 50, and at least one cooperative mode in which the base unit 8 coherently combine with at least one other base unit of the modular RF device 50 as a single phased array RF transmitter or receiver. The LO/Sync signal synchronizes the analog-to-digital and/or digital-to-analog data converters and optionally the mixer 34, to keep phase alignment; while the PPS signal is operative at the other side of the interface, for synchronizing the digital data to/from the computer 11 to ensure sample alignment as the data travels out of the base units 8. It will be appreciated that in some operating scenarios coherent operation of the multiple base units 8 may not be required. For example, for some MIMO applications coherency may not be required, but time synchronization across the base units 8 is still desired. In such embodiments, the LO/Sync signal can be omitted, while the PPS signal is included as previously described to provide the desired time synchronization.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A radio frequency (RF) device comprising:

a computer;

a pulses-per-second (PPS) signal source outputting a PPS signal; and

N base units where N is an integer greater than or equal to two, each base unit including:

a differential segmented aperture (DSA) tile including a support board and a two-dimensional (2D) array of electrically conductive tapered projections disposed on the support board with the electrically conductive tapered projections tapering in a direction extending away from the support board, wherein neighboring pairs of the electrically conductive tapered projections form RF pixels; and at least one RF unit (RFU) having RF connections with the DSA tile to transmit and/or receive RF signals via the RF pixels of the DSA tile and operatively connected to transfer digital data to and/or from the computer;

wherein the RFUs of the N base units are programmed to operate the DSA tiles as a phased RF array with the digital data transferred to and/or from the computer being synchronized using the PPS signal.

2. The RF device of claim 1 wherein the PPS signal source comprises a digital clock.

3. The RF device of claim 1 wherein:

the computer is connected with the RFUs via a wired digital data network; and the PPS signal source is connected to communicate the PPS signal to the RFUs via the wired digital data network.

4. The RF device of claim 3 wherein the wired digital data network comprises an Ethernet.

5. The RF device of claim 3 wherein the PPS signal complies with a precision time protocol (PTP) standard.

6. The RF device of claim 1 wherein the RFUs are configured to digitize RF signals received from the DSA via the RF connections when the RFUs operate the phased RF array in a receive mode.

7. The RF device of claim 1 wherein the RFUs are configured to convert a digital signal received from the computer to an analog RF signal and to send the analog RF signal to the DSA via the RF connections to be transmitted by the DSA when the RFUs operate the phased RF array in a transmit mode.

8. The RF device of claim 1 wherein the phased RF array has a bandwidth of at least 2 GHz.

9. The RF device of claim 1 wherein the phased RF array is configured to implement an IEEE 802.11 communication protocol.

10. The RF device of claim 1 wherein the phased RF array is configured to implement an HPSA+ communication protocol.

11. The RF device of claim 1 wherein the phased RF array is configured to implement a WiMAX communication protocol.

12. The RF device of claim 1 wherein the phased RF array is configured to implement a 3GPP communication protocol.

13. The RF device of claim 1 wherein the phased RF array is configured to implement an ATSC communication protocol.

14. A radio frequency (RF) device comprising:

a differential segmented aperture (DSA) including a support board and a two-dimensional (2D) array of electrically conductive tapered projections disposed on the support board with the electrically conductive tapered projections tapering in a direction extending away from the support board, wherein neighboring pairs of the electrically conductive tapered projections form RF pixels; and at least one RF unit (RFU) having RF connections with the DSA to transmit and/or receive RF signals via the RF pixels of the DSA, wherein the at least one RFU is configured to receive a pulses-per-second (PPS) signal and synchronize digital data transferred between the at least one RFU and an associated computer using the PPS signal.

15. The RF device of claim 14 wherein the at least one RFU comprises an RF integrated circuit (RFIC), or an RF system-on-module (RFSOM) comprising one or more integrated circuits (IC) s disposed on a single printed circuit board (PCB).

16. The RF device of claim 14 wherein the at least one RFU is connected with the DSA by RF connections and the at least one RFU is configured to digitize RF signals received from the DSA via the RF connections when the at least one RFU operates the RF device in a receive mode.

17. The RF device of claim 14 wherein the at least one RFU is connected with the DSA by RF connections and the at least one RFU is configured to convert a received digital signal to an analog RF signal and to send the analog RF signal to the DSA via the RF connections to be transmitted by the DSA when the at least one RFU operates the RF device in a transmit mode.

18. The RF device of claim 14 wherein the DSA has a bandwidth of at least 2 GHz.

19. The RF device of claim 14 wherein the RF device is configured to implement an IEEE 802.11 communication protocol, an HPSA+communication protocol, a WiMAX communication protocol, a 3GPP communication protocol, and/or an ATSC communication protocol.

* * * * *